May 9, 1933.  C. S. NELSON  1,908,437
MOTOR VEHICLE POWER SHIFT
Filed March 29, 1932    2 Sheets-Sheet 1
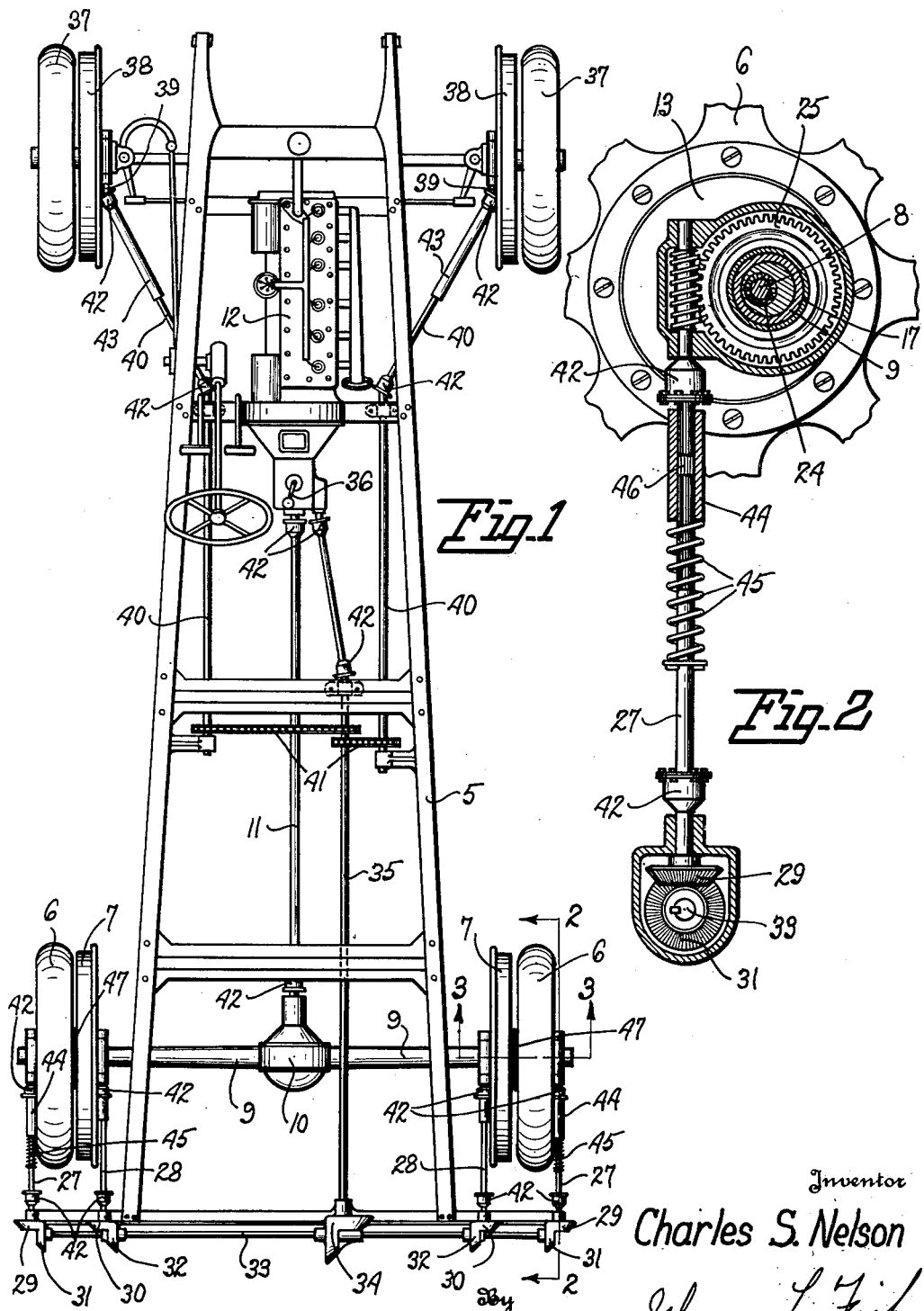

May 9, 1933.　　　　C. S. NELSON　　　　1,908,437
MOTOR VEHICLE POWER SHIFT
Filed March 29, 1932　　2 Sheets-Sheet 2

Inventor
Charles S. Nelson
By Glenn L. Fish
Attorney

Patented May 9, 1933

1,908,437

UNITED STATES PATENT OFFICE

CHARLES S. NELSON, OF SANDPOINT, IDAHO

MOTOR VEHICLE POWER SHIFT

Application filed March 29, 1932. Serial No. 601,777.

My present invention relates to motor vehicle power shifts and is an improvement over the device embodied in my co-pending patent application entitled "Motor vehicle chassis", serial No. 555,163, filed August 5, 1931. Certain objects of my present invention are to provide a more simple and efficient means for raising one set of wheels and lowering the other set when it is desired to change from riding on the road to riding on a rail track or vice versa, and also to provide an improved driving system for the rear wheels of a motor vehicle. Further objects are to provide means whereby the tires on the rear wheels may be removed or replaced, and means for excluding road dust from the gears.

Figure 3:
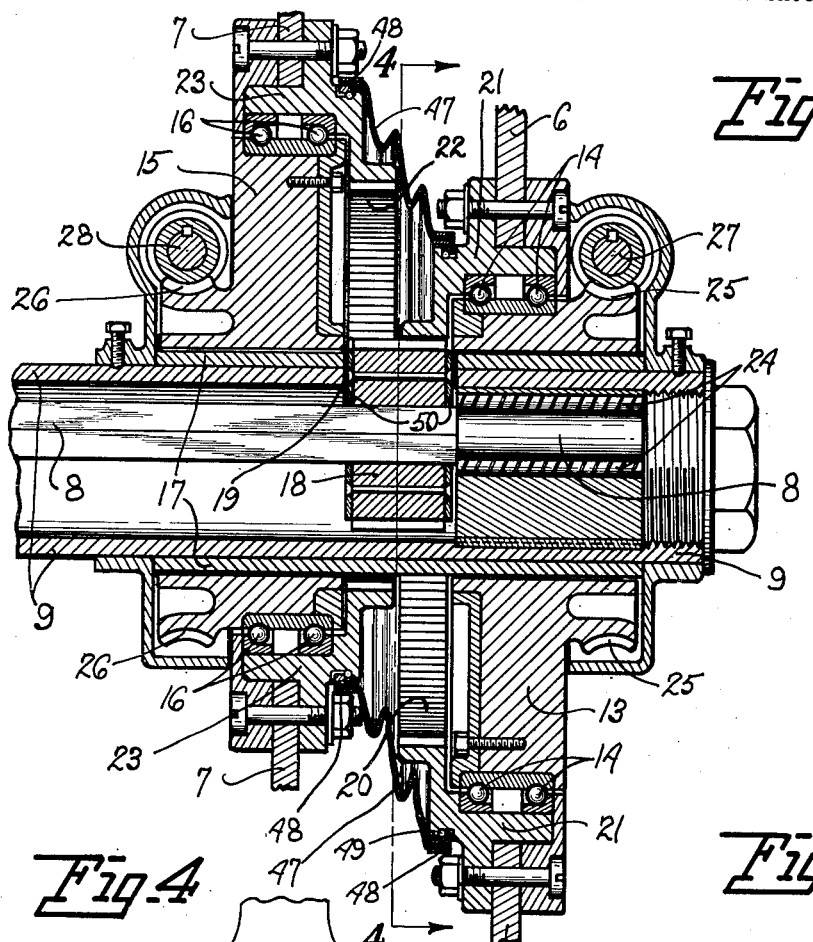
Figure 5:
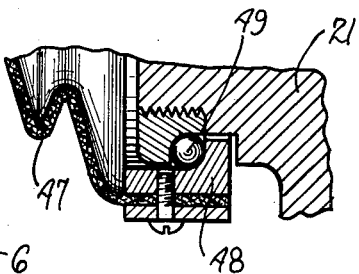
Figure 4:
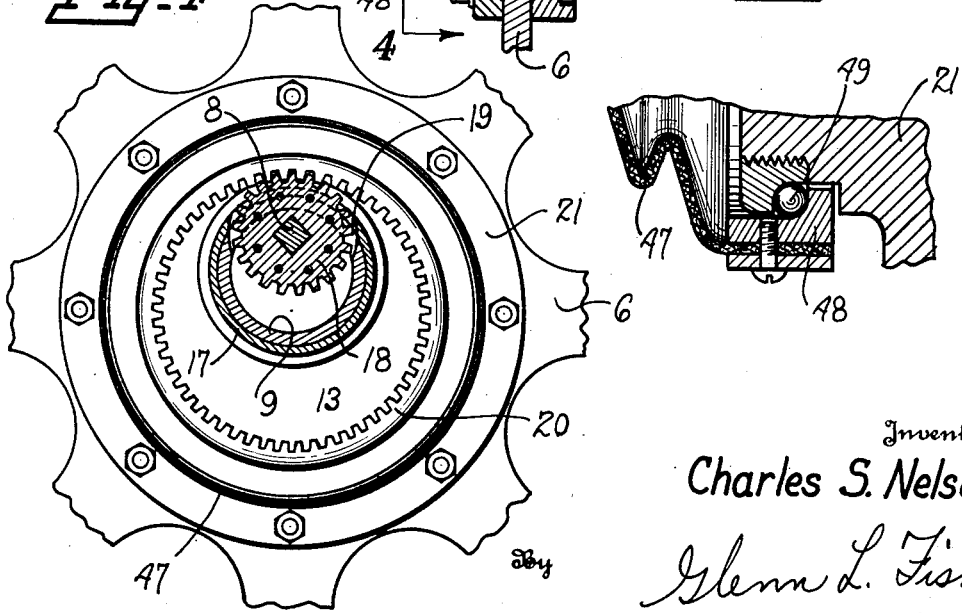

Other and further objects and advantages of the invention will be hereinafter set forth and the novel features thereof defined by the appended claims. In the accompanying drawings: Figure 1 is a top plan view of a motor vehicle chassis embodying the principal features of the invention; Fig. 2 is an enlarged detail view in vertical section taken on a broken line 2—2 of Fig. 1 and showing one of the driving means for the rear wheels together with means for changing the tire; Fig. 3 is an enlarged view in vertical section taken on a broken line 3—3 of Fig. 1 and showing the driving mechanism for both a road tire wheel and its associated flanged track wheel; Fig. 4 is a view in vertical section taken on a broken line 4—4 of Fig. 3 and showing the driving gear arrangement for the rear wheels; and Fig. 5 is a detail view in section showing the means for mounting a dust proof jacket.

Referring more especially to the drawings wherein like reference numerals indicate like parts in the various views, the numeral 5 designates a motor vehicle chassis having a pair of rear road tire wheels 6 and a pair of rear flange track wheels 7 each disposed on the inside and adjacent to each of the tire wheels. Each associated pair of tire and track wheels is driven by an axle shaft 8 which shafts are mounted within axle housings 9 and are driven through a differential 10 by a main shaft 11 connected with an engine 12 in the regular manner.

Referring particularly to Fig. 3 of the drawings, the rear tire wheels 6 are each revolubly mounted in any suitable manner on an eccentric 13, such as by a ball bearing connection shown at 14, while each of the rear flange wheels 7 are revolubly mounted on an eccentric 15 by a ball bearing connection as at 16. Both of said eccentrics are revolubly mounted in spaced apart relation on a bushing 17 which is shrunk or otherwise fixed onto the axle housing 9. The axle shafts 8 are eccentric with respect to their housings as shown in Figs. 2, 3 and 4 and each half portion of said shaft has a pinion 18 fixed thereon. Said pinions project through slots as at 19 that are provided in the upper portion of the axle housings and bushings and is adapted to be brought into mesh with an internal gear 20 provided in the hub 21 that is fixed to the tire wheel 6 and also with an internal gear 22 provided on the hub 23 that is fixed to the track wheel 7. The outer end portion of each of the axle shafts 8 rest in roller bearings 24 mounted within the axle housings.

The eccentric 13 has a worm gear 25 formed thereon and the eccentric 15 has a worm gear 26 thereon. Said worm gears are respectively in mesh with worms formed on stub shafts 27 and 28 which have bevel gears 29 and 30 on their respective remote ends. It will be understood that the foregoing described arrangement is provided on each side of the rear end of the vehicle, and said bevel gears are in mesh with corresponding bevel gears 31 and 32 fixed to a transverse shaft 33. Said shaft has a central bevel gear connections at 34 with a rear longitudinal shaft 35 extending to the engine 12. Any form of power take-off transmission may be used for driving the longitudinal shaft and a lever 36 is shown for shifting the power from the main shaft 11 to said longitudinal shaft. It will be apparent that the foregoing arrangement causes the two eccentrics on both sides of the vehicle to revolve in unison. As said two eccentrics together with their respective tire and flange wheels are normally disposed in vertical and diametrically opposite relation it is merely necessary to cause them to revolve a half revolution in order to cause a reversal of their positions as shown in Fig. 3. In so doing the two rear tire wheels 6 are lifted from the ground and the two flange wheels 7 are lowered into position for riding on a rail track as will be understood. It will be understood that the gears 20 and 22 are alternately brought into mesh with the pinion 18 by the foregoing arrangement, and the gears of the wheels which are lowermost will always be the ones that are in mesh with said pinion as in Figs. 3 and 4 wherein the gear 20 is in mesh therewith. This is a more simple and efficient driving means than that embodied in my above-named co-pending patent application.

As shown and described in my co-pending patent application, the two front tire wheels 37 and their associated flange wheels 38 of my present application are mounted on integral eccentrics. In other words, the tire wheels and their associated flange wheels of the present invention are mounted on a double integral eccentric and it is therefore only necessary to use one work stub shaft as shown at 39 for revolving said integral eccentrics on each side of the vehicle. The mountings for said eccentrics and the connections for the worm shafts are substantially the same as hereinbefore described and no further description is considered necessary. The said stub shafts 39 are connected to forward longitudinal shafts 40 on each side which may be rotated by means of a sprocket and chain connection as shown at 41 with the rear shaft 35 whereby all the wheels move in unison. Universal joints 42 and sleeves 43 telescopically arranged on disconnected portions of the forward shafts allow for steering movement of the front wheels. The numeral 42 is also used to designate various universal joints for the other shafts.

Referring to Fig. 2, the stub shaft 27 is provided with an internally splined sleeve 44 that is retained in place by a spring 45. Should it become necessary to remove a tire from the wheels 6 said sleeve may be moved back against the spring and the shaft may be disconnected at 46 whereby the tire may be removed. In order to protect the gears 18, 21 and 22 from road dust I have provided a flexible jacket 47. As shown in detail in Fig. 5, said jacket may be secured to rings 48 having ball bearing connections 49 with the eccentrics 13 and 15 whereby the wheels may rotate and be shifted freely. The axle housings 9 are made of heavy and durable metal that is adapted to carry heavy loads and the pinion 18 has brass discs 50 secured to its sides with a very small clearance with the slot 19 so that in cases of exceptionally heavy strains the edges of said slot will engage against said brass discs thus strengthening the housings at their weakest points where said slots are cut through.

Having thus described my invention, what I claim and desire to secure by Letters Patent of the United States is:—

1. A motor vehicle power shift comprising a pair of eccentrics revolubly mounted in vertically and diametrically opposite relation on each end of the rear axle housing of the motor vehicle and each of said eccentrics provided with an internal spur gear, a spur pinion secured to the ends of the rear axle within the axle housing and projecting through a slot in the upper side thereof, and means whereby the relative positions of the eccentrics are reversed and the internal gears are alternately brought into mesh with the spur pinion.

2. A motor vehicle power shift comprising a pair of eccentrics revolubly mounted in vertically and diametrically opposite relation on each end of the rear axle housing of the motor vehicle, a hub revolubly mounted on each of said eccentrics, a road tire on one of said hubs and a flanged track engaging rim on the other hub, said hubs each having an internal spur gear, a spur pinion secured to the ends of the rear axle, within the axle housing and projecting through a slot in the upper side thereof, and means whereby the relative positions of the eccentrics are reversed and whereby the internal gears are alternately brought into mesh with the spur pinion.

3. In a motor vehicle power shift comprising a pair of eccentrics revolubly mounted in vertically and diametrically opposite relation, and means for reversing the relative positions of the eccentrics and a hub revolubly mounted on each of said eccentrics, the combination of a flexible dust proof jacket revolubly connected to the hubs.

4. A motor vehicle power shift comprising a pair of eccentrics revolubly mounted in vertically and diametrically opposite relation on each end of the rear axle housing of the motor vehicle, a hub revolubly mounted on each of said eccentrics, a road tire on one of said hubs and a flanged track-engaging rim on the other hub, said hubs each having an internal spur gear, a spur pinion secured to the ends of the rear axle shaft within the axle housing and projecting through a slot in the upper portion thereof, a worm gear on each of the eccentrics, a wormed shaft in mesh with each of said worm gears, and shafts connecting said wormed shaft with the engine of the vehicle whereby the relative positions of the eccentrics are reversed and the internal gears for the hubs are alternately brought into mesh with the spur pinion.

5. In a motor vehicle power shift comprising a pair of eccentrics revolubly mounted in diametrically opposite relation, tires carried on said eccentrics, and means for reversing the relative positions of the eccentrics comprising wormed jack shafts in mesh with worm gears on the eccentrics, the combination of means for disconnecting the jack shafts whereby the tires may be removed.

6. In a motor power shift comprising a pair of eccentrics revolubly mounted in diametrically opposite relation on each end of the axle housing of the motor vehicle, revoluble hubs mounted on the eccentrics, wheels mounted on the hubs, said hubs each having an internal spur gear. A rear axle, said axle supported eccentrically within the axle housing, a spur pinion secured to the end of the rear axle and projecting through a slot in the housing, and means whereby the relative positions of the eccentrics are reversed and the internal gears are alternately brought into mesh with the spur pinion.

In testimony whereof I affix my signature.

CHARLES S. NELSON.